United States Patent Office 2,970,049
Patented Jan. 31, 1961

2,970,049
SOIL AMENDMENT AND NUTRIENT INCLUSION

Robert J. Dalton, San Bernardino, Calif.
(2723 Graysby Ave., San Pedro, Calif.)

No Drawing. Filed Dec. 30, 1953, Ser. No. 401,375

4 Claims. (Cl. 71—63)

This invention relates to soil conditioners, and more particularly to soil amendments and nutrient inclusions for improving the condition and also improving the mineral content of soil, especially in supplying so-called "trace" elements to deficient soils.

It is well known that various minerals are indispensable to plant growth, and soil must contain a certain amount of these "trace" elements to provide optimum plant growth. Practice to date provides for the treatment of soil for deficiencies of specific elements, or chemically treating the soil to form utilizable compositions of the included elements in the soil which are not readily available as plant food.

These required elements may occur in nature as sulfides, and as natural minerals are very inert and decompose only very slowly under normal atmospheric conditions and soil environment. The decomposition of these minerals takes place during normal soil building processes; however, with certain minerals the natural process requires far too long a time, and is not feasible for a quick correction of a particular deficiency of a soil which is under active use. For example, iron is an essential constituent of soil, and it is commonly added to soil as iron sulfate. Thus, iron sulfate may be used as a soil amendment; however, under certain conditions the excessive iron sulfate is toxic to plant growth. Iron pyrite, on the other hand, is extremely stable, and its addition to an alkaline or saline soil or to a soil deficient in iron or sulfur or both has met with very little success due to the resistance of the iron pyrite to decomposition under normal soil conditions. Other naturally occurring sulfides are, likewise, very resistant to decomposition under normal atmospheric conditions.

The trace elements necessary for optimum plant growth include iron, zinc, copper, manganese, molybdenum, nickel, cobalt and other minor elements. All of these elements are found as primary minerals, which are very stable in the absence of highly oxidizing conditions. I have discovered that iron pyrite or a concentration of naturally occurring sulfides or an aggregate of naturally occurring metal sulfides of any desired composition may be treated so that the initially inert character of the sulfides is changed into such a form that they are in a desirable condition for introduction into soil. The treated sulfides provide a soil amendment which may be prepared for a prescribed condition in the soil for immediate correction and which will, also, provide unstable sulfides that will continue to decompose and provide mineral requirements over a substantial period of time, providing a latent source of these materials. When naturally occurring sulfides of the metals are used, an aggregate will normally contain all the trace elements that are essential for optimum plant growth. The treatment of the natural sulfides includes heating the ores under controlled conditions of temperature and a substantially non-oxygenous atmosphere and the like to change the character of the sulfide and to provide sublimed elemental sulfur. The sublimed elemental sulfur may be condensed and fed back to the calcined product thus making a product containing free sulfur, simple sulfides and a minor amount of sulfates of the desirable elements in a usable form. The use of elemental sulfur in pest control is well known.

Alkalinity develops in soils from the kaolinization process in the decomposition of feldspar, capillary action of the ground waters, or is rapidly induced by surface irrigation or flows. Iron sulfate has produced excellent results in the reclamation of black alkali soils, but its use is limited because of the high cost of the compound. Also, irrigation, in general, may continually induce alkalinity so the soil conditioning must, also, be a continuing process. Sulfur is important to the improvement of the soil. Iron pyrite provides both the essential ingredients, however, its oxidation rate is too slow to be commercially useful.

The treated sulfide concentrates are useful for alkali soil reclamation and/or maintaining optimum soil pH for plant growth, where the concentrates have a substantial quantity of iron pyrite. The treated sulfides of the invention are valuable as a nutrient inclusion in soil, fertilizers containing nitrogen, phosphorus and potassium, and the like, and when included in organic fertilizers and the like, tend to provide a balanced ration for plants. The nature of the treated sulfides provides a latent source of minerals, whereby the materials are converted to usable form over a relatively short period of time.

Included among the objects and advantages of the present invention is a new and useful soil amendment and nutrient inclusion. The invention further provides for a soil amendment and nutrient inclusion providing substantially all necessary trace elements to the soil in a readily usable form. The invention, further, provides for introducing iron into soil in a desirable form to correct undesirable characteristics of the soil; in addition, the product provides "trace" elements as a nutrient inclusion or plant food. The invention, furthermore, provides for a process for treating naturally occurring sulfides to provide an efficient soil amendment containing nutrient inclusions such as iron and trace elements in a form readily convertible to usable form, and providing for the production of elemental sulfur which may be added to the soil amendment, as well as providing a latent source of the materials as a continuing source of these materials to the plant.

These and other objects and advantages may be readily apparent by referring to the following description of the invention.

A sulfide concentrate from a froth flotation treatment of a copper-zinc ore, of the type found in Southwestern Arizona, was heated in a furnace to the incipient kindling point, a low red heat of about 450° C. hearth temperature, in a substantially non-oxygenous atmosphere for a time to partially oxidize a minor portion of the ore and further reducing the ore produce sublimed elemental sulfur. In general, iron pyrite heated to incandescence or incipient kindling temperature in the absence of air gives up a molecule of sulfur as elemental sulfur leaving magnetic iron sulfide of indeterminable composition, but generally coming within the formula $Fe_nS_{n+1}$, where $n$ is greater than 1. The treated trace elements conform generally to the formula $R_nS_{n+1}$, wherein R is a trace element other than iron and $n$ is greater than 1. The sublimed sulfur is recovered and returned to the treated composition as elemental sulfur.

The concentrate may be a mix of the concentrate of several different ores, blended to provide a balance of the various necessary elements. The concentrate, also, may be naturally occurring sulfide ores or a mix of various sulfide ores to give a desired blend. The ores are generally heated in a substantially non-oxygenous atmosphere to change the iron sulfide, usually the pyrite $FeS_2$, to a simple iron sulfide $FeS$ and elemental sulfur. The heating is accomplished at about the incipient kindling point of the iron sulfide, and the retained sulfides are in the most desirable condition for introduction into soil.

While the invention has been illustrated by a specific example, it is not intended to limit it to the specific details so described, except insofar as set forth in the following claims.

I claim:

1. A soil amendment and nutrient inclusion comprising a converted concentrate of naturally occurring sulfides inclusive of a major portion of iron pyrite and minor portions of trace elements as sulfides, said iron pyrite and other sulfides being characterized by having been converted through heating said concentrate of naturally occurring sulfides to at least a low red heat in a relatively non-oxygenous atmosphere and thereby converting the iron pyrite to a composition represented by the formula $Fe_nS_{n+1}$, wherein $n$ is greater than 1, so as to form a readily usable, decomposable, magnetic iron sulfide and elemental sulfur; and converting the trace elements to readily usable simple sulfide compositions.

2. The process of converting iron pyrite into a composition for use as a soil amendment and nutrient material, which comprises first subjecting a charge of iron pyrite to heating in a substantially non-oxygenous atmosphere to about 450° C., terminating said heating after incipient kindling has occurred so as to convert most of said charge to a composition represented by the formula $Fe_nS_{n+1}$, wherein $n$ is greater than 1, recovering sublimed sulfur of such conversion, and returning the sublimed sulfur to the converted iron composition whereby to form a substantially unstable product which will react rapidly with air and water in the soil to form usable sulfate compositions therein.

3. The process of converting iron pyrite and naturally-occurring associated sulfides into a composition for use as a soil amendment and nutrient material, which comprises first subjecting a charge of iron pyrite and associated naturally-occurring sulfides to heating in a substantially non-oxygenous atmosphere to about 450° C., terminating said heating after incipient kindling has occurred so as to convert a major portion of said charge to a composition represented by the formula $Fe_nS_{n+1}$, wherein $n$ is greater than 1, and another portion is converted to a composition represented by the formula $R_nS_{n+1}$, wherein $R$ represents a trace metal other than iron and $n$ is greater than 1, recovering sublimed sulfur of such conversion, and returning the sublimed sulfur to the converted iron composition whereby to form a substantially unstable product which will react rapidly with air and water in the soil to form usable sulfate compositions therein.

4. A soil amendment and nutrient inclusion, comprising the reaction product of an iron pyrite composition heated in a substantially non-oxygenous atmosphere to about its incipient kindling temperature forming a substantially unstable composition, a major portion of which is represented by the formula $Fe_nS_{n+1}$, wherein $n$ is greater than 1, and a minor portion of which is recovered sublimed elemental sulfur, said composition being characterized by its ability to form usable sulfates by rapid oxidation when implanted in soil.

References Cited in the file of this patent

UNITED STATES PATENTS

| | | |
|---|---|---|
| 238,240 | Lippincott | Mar. 1, 1881 |
| 1,283,677 | Connor | Nov. 5, 1918 |
| 1,353,931 | Miller | Sept. 28, 1920 |
| 1,490,774 | Harnist | Apr. 15, 1924 |
| 1,614,305 | Johnson | Jan. 11, 1927 |
| 1,937,039 | Johnston et al. | Nov. 28, 1933 |
| 2,058,480 | McCallum et al. | Oct. 27, 1936 |
| 2,530,630 | Renken | Nov. 21, 1950 |
| 2,532,548 | Heide | Dec. 5, 1950 |
| 2,623,819 | Paoloni et al. | Dec. 30, 1952 |
| 2,637,629 | Lewis | May 5, 1953 |
| 2,683,077 | Lewis | July 6, 1954 |
| 2,699,387 | Osborn | Jan. 11, 1955 |

FOREIGN PATENTS

| | | |
|---|---|---|
| 455,121 | Italy | Feb. 14, 1950 |
| 456,362 | Italy | Apr. 1, 1950 |